United States Patent
Kim

(10) Patent No.: US 10,388,915 B2
(45) Date of Patent: Aug. 20, 2019

(54) RECHARGEABLE BATTERY

(71) Applicant: SAMSUNG SDI CO., LTD., Yongin-si, Gyeonggi-do (KR)

(72) Inventor: Dukjung Kim, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 133 days.

(21) Appl. No.: 14/643,400

(22) Filed: Mar. 10, 2015

(65) Prior Publication Data

US 2015/0364727 A1    Dec. 17, 2015

(30) Foreign Application Priority Data

Jun. 17, 2014 (KR) .................. 10-2014-0073643

(51) Int. Cl.
*H01M 2/02*     (2006.01)
*H01M 10/04*    (2006.01)
(Continued)

(52) U.S. Cl.
CPC ........... *H01M 2/02* (2013.01); *H01M 2/0242* (2013.01); *H01M 2/0277* (2013.01); *H01M 2/04* (2013.01);
(Continued)

(58) Field of Classification Search
CPC ...... H01M 2/02; H01M 10/0431; H01M 2/04; H01M 2/30; H01M 10/0587;
(Continued)

(56) References Cited

U.S. PATENT DOCUMENTS 6,383,234 B1    5/2002 Noh
8,383,261 B2    2/2013 Mizuta et al.
(Continued)

FOREIGN PATENT DOCUMENTS

CN    102035017 A    4/2011
EP    2 309 569 A1   4/2011
(Continued)

OTHER PUBLICATIONS

Extended European Search Report dated Apr. 12, 2016 in Corresponding European Patent Application No. 15168205.1.
(Continued)

*Primary Examiner* — Jonathan G Jelsma
*Assistant Examiner* — Omar M Kekia
(74) *Attorney, Agent, or Firm* — Lee & Morse, P.C.

(57) ABSTRACT

A rechargeable battery including an electrode assembly having a first electrode tab upwardly protruding from the electrode assembly and a second electrode tab upwardly protruding from the electrode assembly; a first support body surrounding a side portion of the electrode assembly; a case accommodating the electrode assembly and the first support body, the case having a top opening; and a cap assembly sealing the top opening of the case, wherein the first support body includes a plate-shaped main body contacting one long side surface of the electrode assembly, and a side surface part bent from the main body, the side surface part having elasticity and surrounding short side surfaces of the electrode assembly.

13 Claims, 8 Drawing Sheets

(51) Int. Cl.
   *H01M 2/04* (2006.01)
   *H01M 2/30* (2006.01)
   *H01M 2/14* (2006.01)
   H01M 10/052 (2010.01)
   H01M 10/0587 (2010.01)
(52) U.S. Cl.
   CPC ............... *H01M 2/14* (2013.01); *H01M 2/30* (2013.01); *H01M 10/0431* (2013.01); *H01M 10/0445* (2013.01); *H01M 10/052* (2013.01); *H01M 10/0587* (2013.01)
(58) Field of Classification Search
   CPC .. H01M 2/0242; H01M 2/14; H01M 10/0445; H01M 10/052; H01M 2/0277
   USPC ....................................... 429/94, 178, 185, 4
   See application file for complete search history.

(56) References Cited

U.S. PATENT DOCUMENTS

| | | | |
|---|---|---|---|
| 8,492,022 | B2 | 7/2013 | Kim et al. |
| 8,741,468 | B2 | 6/2014 | Mizuta et al. |
| 9,123,918 | B2 | 9/2015 | Tsutsumi et al. |
| 9,379,363 | B2 | 6/2016 | Kanemoto et al. |
| 9,577,226 | B2 | 2/2017 | Kim et al. |
| 9,837,642 | B2 | 12/2017 | Tsutsumi et al. |
| 2009/0263712 | A1 | 10/2009 | Mizuta et al. |
| 2011/0081573 | A1* | 4/2011 | Kim ..................... H01M 2/0202 429/186 |
| 2011/0117402 | A1 | 5/2011 | Kim et al. |
| 2011/0135999 | A1* | 6/2011 | Kwak ................. H01M 2/0207 429/163 |
| 2011/0236750 | A1 | 9/2011 | Kohno et al. |
| 2012/0052341 | A1* | 3/2012 | Kim ..................... H01M 2/043 429/53 |
| 2012/0052349 | A1* | 3/2012 | Kim ..................... H01M 2/1061 429/94 |
| 2012/0107681 | A1 | 5/2012 | Kogure |
| 2012/0160559 | A1 | 6/2012 | Tsutsumi et al. |
| 2012/0196166 | A1* | 8/2012 | Kim ..................... H01M 2/206 429/94 |
| 2013/0078507 | A1 | 3/2013 | Mizuta et al. |
| 2013/0302667 | A1 | 11/2013 | Kim et al. |
| 2014/0087223 | A1 | 3/2014 | Hamakawa et al. |
| 2014/0147732 | A1 | 5/2014 | Kanemoto et al. |
| 2015/0357607 | A1 | 12/2015 | Tsutsumi et al. |

FOREIGN PATENT DOCUMENTS

| | | |
|---|---|---|
| EP | 2 639 876 A1 | 9/2013 |
| EP | 2 804 234 A1 | 11/2014 |
| JP | 2010-50111 A | 3/2010 |
| JP | 2011-82162 A | 4/2011 |
| JP | 2011-146151 A | 7/2011 |
| JP | 2012-54236 A | 3/2012 |
| JP | 2012-099252 A | 5/2012 |
| JP | 2012-151099 A | 8/2012 |
| JP | 2014-38706 A | 2/2014 |
| KR | 2007-0097142 A | 10/2007 |
| KR | 2011-0053163 A | 5/2011 |
| WO | WO 2007/105541 A1 | 9/2007 |
| WO | WO 2013/012084 A1 | 1/2013 |

OTHER PUBLICATIONS

Extended European Search Report dated Nov. 12, 2015 in Corresponding European Patent Application No. 15168205.1.
Office Action dated May 29, 2018 of the Japanese Patent Application No. 2014-184610.
Office Action dated Jan. 8, 2019 of the Japanese Patent Application No. 2014-184610.
Office Action dated Jul. 30, 2018 of the Chinese Patent Application No. 201510172361.9.

* cited by examiner

RECHARGEABLE BATTERY

CROSS-REFERENCE TO RELATED APPLICATION

Korean Patent Application No. 10-2014-0073643 filed on Jun. 17, 2014, in the Korean Intellectual Property Office, and entitled: "Rechargeable Battery," is incorporated by reference herein in its entirety.

BACKGROUND

1. Field

Embodiments relate to a rechargeable battery.

2. Description of the Related Art

Unlike primary batteries, which cannot be recharged, rechargeable batteries can be repeatedly charged and discharged. Low capacity rechargeable batteries that use single battery cells may be used as power sources for various small-sized portable electronic devices such as cellular phones and camcorders. High capacity rechargeable batteries that use tens of battery cells connected to each other in a battery pack may be used as power sources for driving motors such as in hybrid electric vehicles (HEV).

Rechargeable batteries are manufactured in various shapes, and representative shapes thereof may include a cylindrical shape and a prismatic shape. Rechargeable batteries may be configured such that an electrode assembly (which is formed by interposing a separator serving as an insulator between positive and negative electrodes) and an electrolyte solution are housed in a case, and a cap plate is installed in the case. Positive and negative electrode terminals are connected to the electrode assembly and then exposed or protruded to the outside through the cap plate.

SUMMARY

Embodiments are directed to a rechargeable battery.

The embodiments may be realized by providing a rechargeable battery including an electrode assembly having a first electrode tab upwardly protruding from the electrode assembly and a second electrode tab upwardly protruding from the electrode assembly; a first support body surrounding a side portion of the electrode assembly; a case accommodating the electrode assembly and the first support body, the case having a top opening; and a cap assembly sealing the top opening of the case, wherein the first support body includes a plate-shaped main body contacting one long side surface of the electrode assembly, and a side surface part bent from the main body, the side surface part having elasticity and surrounding short side surfaces of the electrode assembly.

The electrode assembly may include a first electrode plate, a second electrode plate, and a separator between the first electrode plate and the second electrode plate, the first electrode tab may be a non-coated portion of the first electrode plate of the electrode assembly, and the second electrode tab may be a non-coated portion of the second electrode plate of the electrode assembly.

The electrode assembly may include a first electrode assembly and a second electrode assembly, and a long side surface of the first electrode assembly may face a long side surface of the second electrode assembly.

The first electrode assembly and the second electrode assembly may be wound to be formed in a jelly-roll shape.

The main body of the first support body may be interposed between the long side surface of the first electrode assembly and the facing long side surface of the second electrode assembly.

The side surface part of the first support body may include a first side surface part set surrounding both short side surfaces of the first electrode assembly; and a second side surface part set surrounding both short side surfaces of the second electrode assembly.

The first side surface part set may have a complementary shape with respect to the short side surface of the jelly-roll shaped first electrode assembly, and the second side surface part set may have a complementary shape with respect to the short side surface of the jelly-roll shaped second electrode assembly.

The cap assembly may include a cap plate sealing the top opening of the case; a first terminal electrically connected to the first electrode tab, the first terminal upwardly protruding while passing through the cap plate; and a second terminal electrically connected to the second electrode tab, the second terminal upwardly protruding while passing through the cap plate.

The first electrode tab of the electrode assembly may be welded to the first terminal, and the second electrode tab of the electrode assembly may be welded to the second terminal.

The first support body may have a height that is smaller than or equal to a height of the long side surface of the electrode assembly.

The rechargeable battery may further include a second support body interposed between a bottom surface of the electrode assembly and the case.

The first support body and the second support body may be insulators.

The second support body may have a plate shape, and may include a second coupling part, the second coupling part protruding at opposite edges of the second coupling part toward the cap assembly and being coupled with the first support body.

The first support body may further include a first coupling part at a bottom end of the side surface part, the first coupling part being coupled with the second coupling part of the second support body.

The first coupling part may be a protrusion that protrudes outwardly, and the second coupling part may include a hole aligned with the first coupling part such that the first coupling part is inserted and fixed to the second coupling part.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
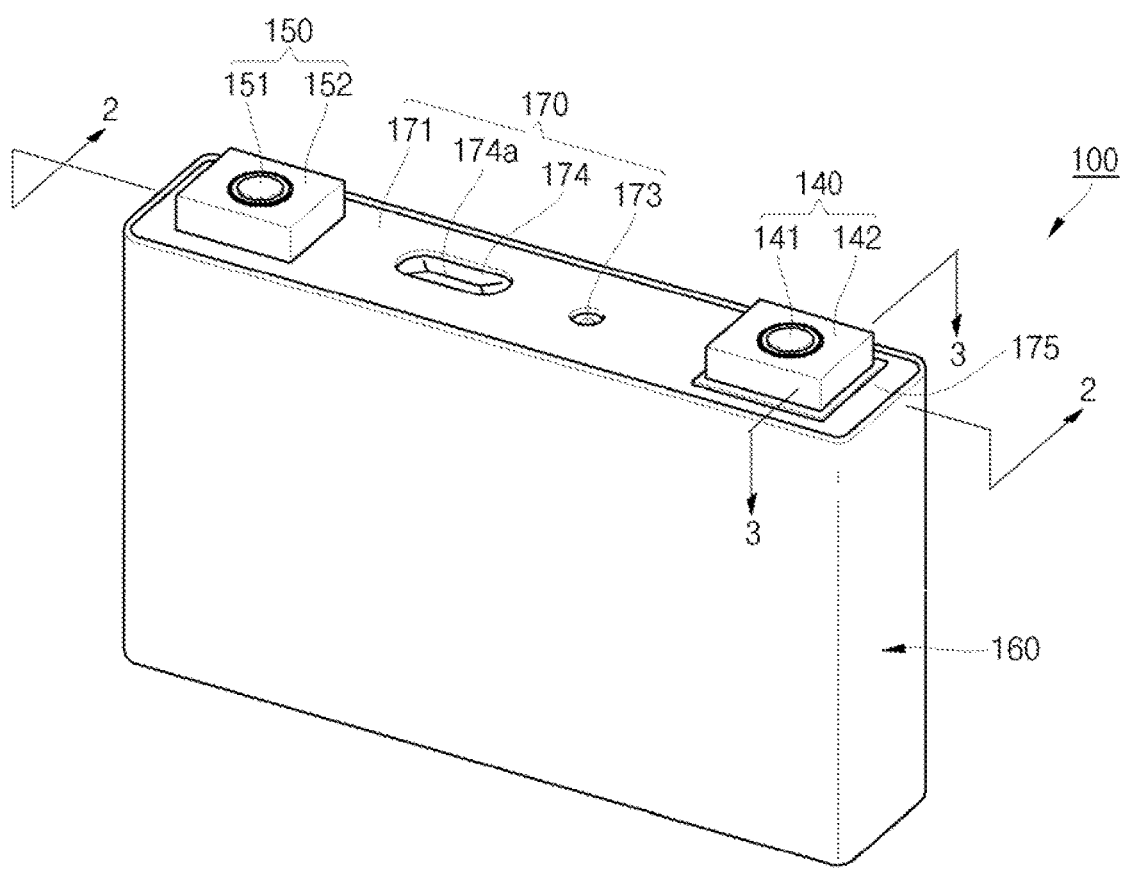
FIG. 1 illustrates a perspective view of a rechargeable battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

As used herein, the term "and/or" includes any and all combinations of one or more of the associated listed items.

The terminology used herein is for the purpose of describing particular embodiments only and is not intended to be limiting of the invention. As used herein, the singular forms are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various members, elements, regions, layers and/or parts, these members, elements, regions, layers and/or parts should not be limited by these terms. These terms are only used to distinguish one member, element, region, layer and/or part from another member, element, region, layer and/or part. Thus, for example, a first member, element, region, layer, and/or part discussed below could be termed a second member, element, region, layer, and/or part without departing from the teachings of the present invention.

Figure 2:
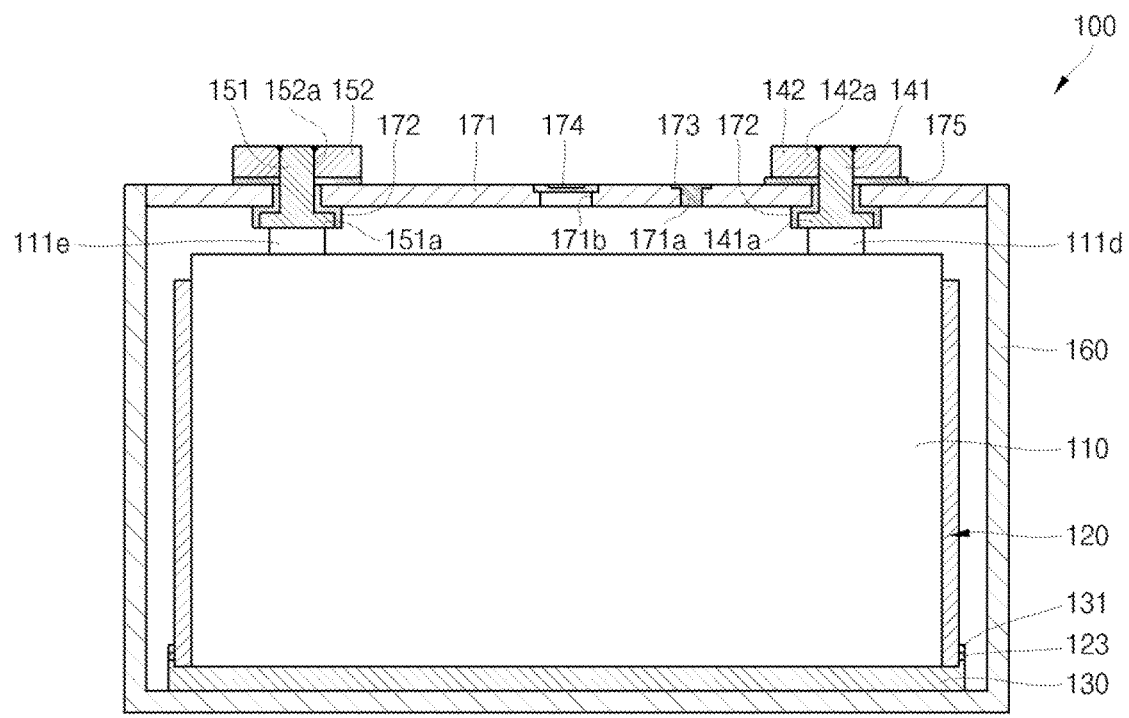
FIG. 2 illustrates a cross-sectional view taken along the line 2-2 of the rechargeable battery shown in FIG. 1.
Figure 3:
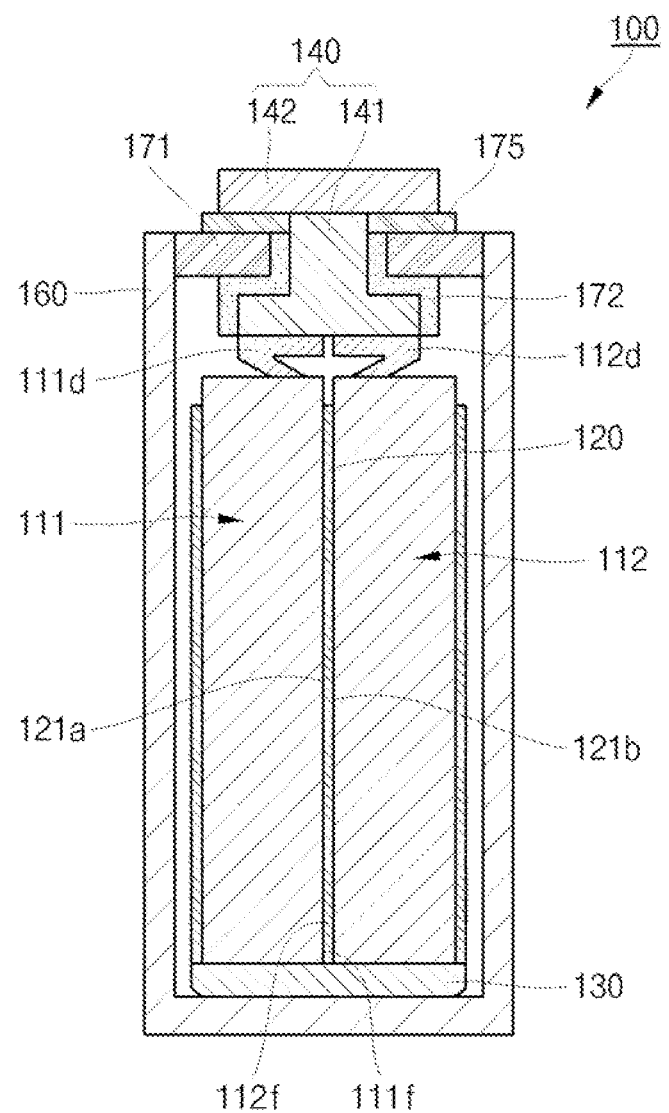
FIG. 3 illustrates a cross-sectional view taken along the line 3-3 of the rechargeable battery shown in FIG. 1.
Figure 4:
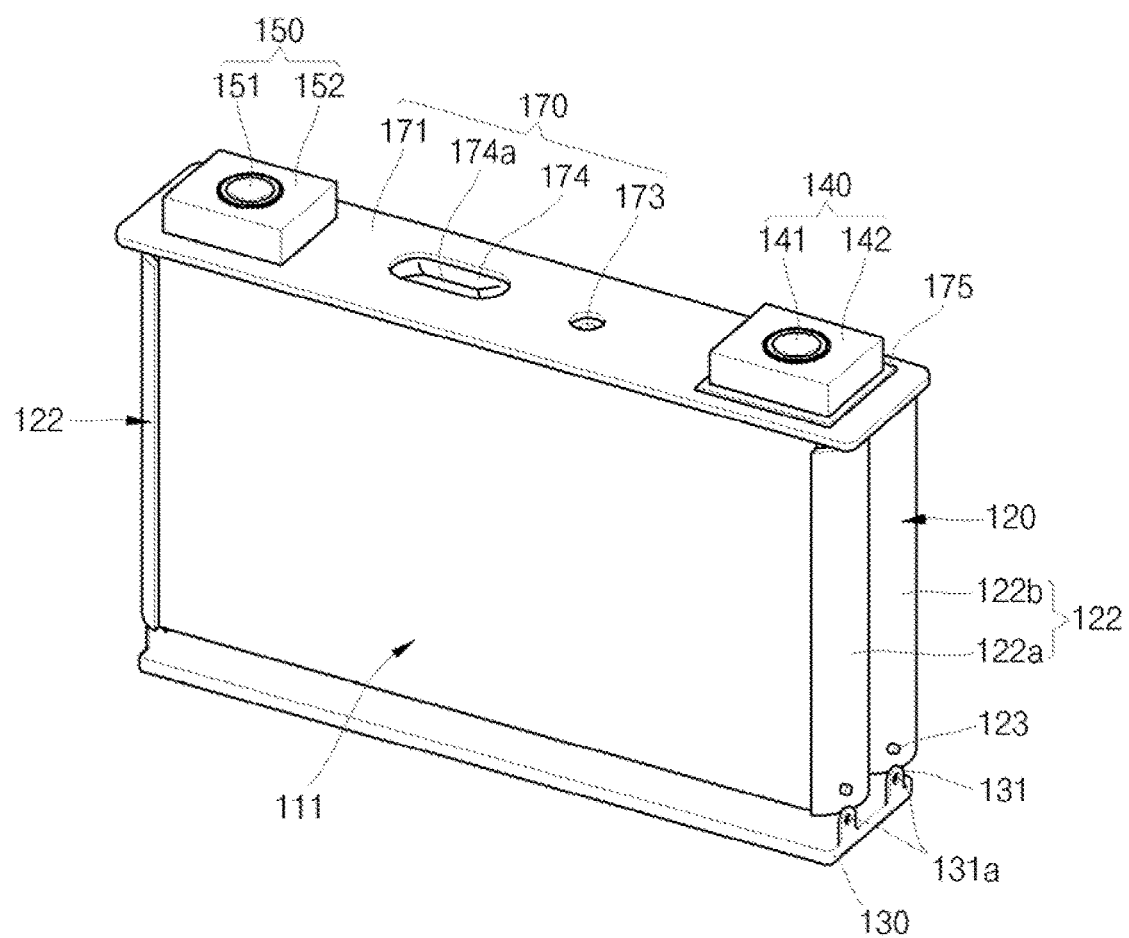
FIG. 4 illustrates an internal perspective view of an internal structure, except for a case, from the rechargeable battery shown in FIG. 1.
Figure 5:
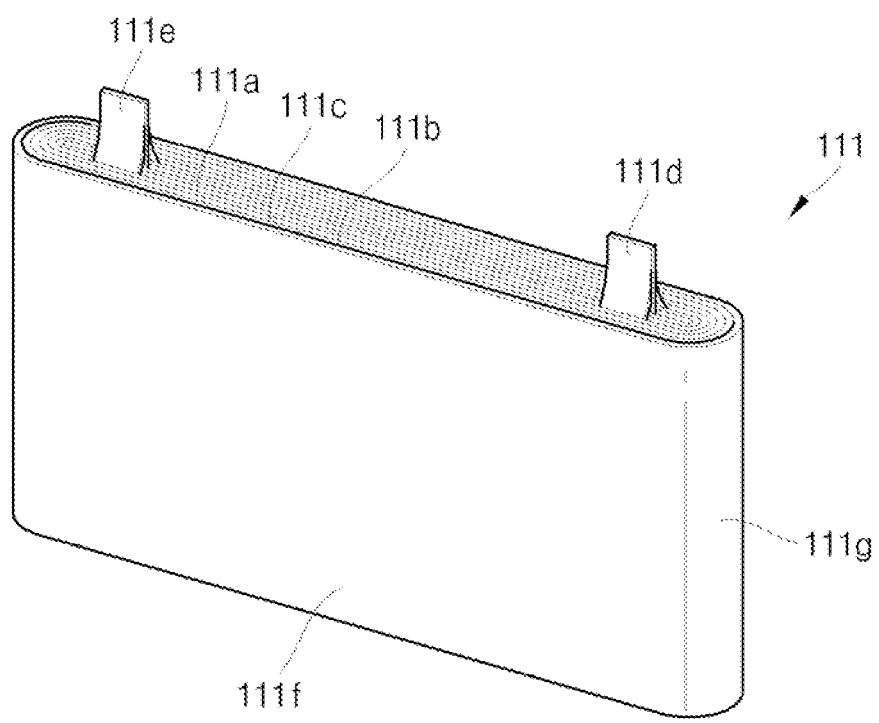
FIG. 5 illustrates an enlarged perspective view of a first electrode assembly in the rechargeable battery shown in FIG. 1.
Figure 6:
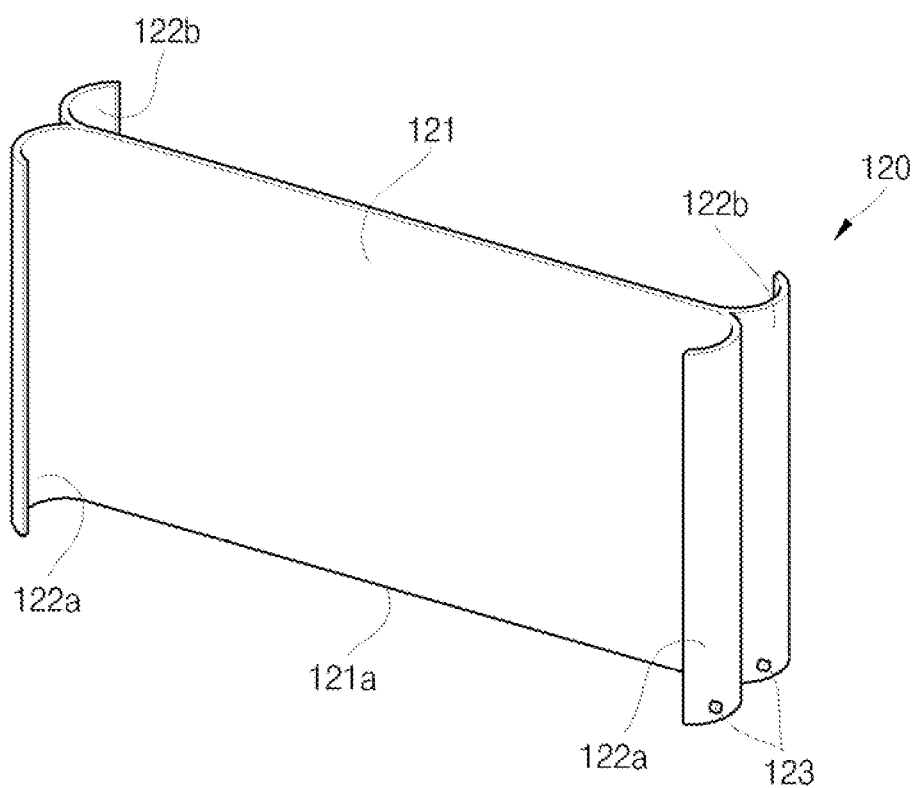
FIG. 6 illustrates an enlarged perspective view of a first support body in the rechargeable battery shown in FIG. 1.

FIG. 1 illustrates a perspective view of a rechargeable battery according to an embodiment, FIG. 2 illustrates a cross-sectional view taken along the line 2-2 of the rechargeable battery shown in FIG. 1, FIG. 3 illustrates a cross-sectional view taken along the line 3-3 of the rechargeable battery shown in FIG. 1, and FIG. 4 illustrates an internal perspective view of an internal structure, except for a case, from the rechargeable battery shown in FIG. 1. FIG. 5 illustrates an enlarged perspective view of a first electrode assembly in the rechargeable battery shown in FIG. 1; and FIG. 6 illustrates an enlarged perspective view of a first support body in the rechargeable battery shown in FIG. 1.

Hereinafter, the rechargeable battery according to an embodiment will be described with reference to FIGS. 1 to 6.

As shown in FIGS. 1 to 6, the rechargeable battery 100 may include, e.g., a plurality of electrode assemblies 110, a first support body 120, a second support body 130, a first terminal 140, a second terminal 150, a case 160, and a cap assembly 170.

The plurality of electrode assemblies 110 may include a first electrode assembly 111 and a second electrode assembly 112. The following description will be made with regard to a case in which the plurality of electrode assemblies 110 is comprised of two electrode assemblies. The first electrode assembly 111 may be formed by winding a stacked structure of a first electrode plate 111a, a separator 111c, and a second electrode plate 111b, which are formed of thin plates or layers. In addition, the second electrode assembly 112 may be formed by winding a stacked structure of a first electrode plate 112a, a separator 112c, and a second electrode plate 112b, which are formed of thin plates or layers.

For example, the first electrode assembly 111 and the second electrode assembly 112 may be jelly-roll type electrode assemblies formed by winding a stacked structure of first electrodes 111a and 112a, the separators 111c, 112c, and the second electrodes 111b and 112b. In addition, in the plurality of electrode assemblies 111 and 112, the first electrode plates 111a and 112a may function as negative electrodes and the second electrode plates 111b and 112b may function as positive electrodes, and vice versa.

The first electrode assembly 111 and the second electrode assembly 112 may have the same shape, and the following description will be made with regard to the first electrode assembly 111 by referring to FIG. 5.

The first electrode assembly 111 may include two long side surfaces 111f (that are planar and parallel to each other) and two short side surfaces 111g (connecting the long side surfaces 111f). The short side surfaces 111g may be curved, e.g., because the first electrode assembly 111 is formed by winding.

The first electrode plate 111a may be formed by coating a first electrode active material, e.g., a transition metal oxide, on a first electrode collector formed of a metal foil made of, e.g., copper or nickel, and may include a first electrode non-coated portion 111d that is not coated with a first electrode active material. The first electrode non-coated portion 111d may form a path for current flow between the first electrode plate 111a and the outside of the first electrode plate 111a. For example, the first electrode non-coated portion 111d may protrude to or at an upper portion of the first electrode assembly 111 by a predetermined length to become a first electrode tab 111d. The embodiments are not limited to the materials for the first electrode plate 111a listed herein.

The second electrode plate 111b may be formed by coating a second electrode active material, e.g., graphite or carbon, on a second electrode collector formed of a metal foil made of, e.g., aluminum, and may include a second electrode non-coated portion 112e that is not coated with a second electrode active material. The second electrode non-coated portion 112e may form a path for current flow between the second electrode plate 111b and the outside of the second electrode plate 111b.

In an implementation, the second electrode non-coated portion 112e may protrude to or at an upper portion of the first electrode assembly 111 by a predetermined length to become a second electrode tab 111e. The embodiments are not limited to the materials for the second electrode plate 111b listed herein.

The separator 111c may be positioned between the first electrode plate 111a and the second electrode plate 111b, and may facilitate movement of lithium ions while preventing electrical shorts. The separator 111c may be made of e.g., polyethylene, polypropylene, or a combination of polyethylene and polypropylene. The embodiments are not limited to the materials for the separator 111c listed herein.

The first electrode assembly 111 may be arranged such that a first long side surface 111f faces a first long side surface 112f of the second electrode assembly 112. In an implementation, the first support body 120 may be disposed between the first long side surface 111f of the first electrode assembly 111 and the facing first long side surface 112f of the second electrode assembly 112.

The first electrode tab 111d of the first electrode assembly 111 and the first electrode tab 112d of the second electrode assembly 112 may be electrically connected to the first terminal 140, and the second electrode tab 111e of the first electrode assembly 111 and the second electrode tab 111e of the second electrode assembly 112 may be electrically connected to the second terminal 150. In an implementation, the first electrode tab 111d of the first electrode assembly 111 and the first electrode tab 112d of the second electrode assembly 112 may be welded to the first terminal 140, and the second electrode tab 111e of the first electrode assembly 111 and the second electrode tab of the second electrode assembly 112 may be welded to the second terminal 150 to then be electrically connected.

The plurality of electrode assemblies 110 may be housed in the case 160 with an electrolyte solution. The electrolyte solution may include an organic solvent such as dimethyl carbonate (DMC), diethyl carbonate (DEC), ethylmethyl carbonate (EMC), ethylene carbonate (EC), propylene carbonate (PC), or the like, and a lithium salt such as $LiPF_6$ or $LiBF_4$. The electrolyte solution may be in a liquid, a solid or, a gel phase.

The first support body 120 may fix the plurality of electrode assemblies 110 to an interior side of the case 160 while surrounding side portions of the first electrode assembly 111 and the second electrode assembly 112. The first support body 120 is illustrated in FIG. 6 and the first support body 120 will now be described with reference to FIGS. 5 and 6.

The first support body 120 may include a plate-shaped main body 121 and a side surface part 122 that is bent from the main body 121 and that has elasticity, e.g., has elastic properties. In an implementation, the main body 121 of the first support body 120 and the side surface part 122 of the first support body 120 may be integrally formed.

The main body 121 may be plate-shaped and may be interposed between the first electrode assembly 111 and the second electrode assembly 112. In the main body 121, a first surface 121a may contact the first long side surface 111f of the first electrode assembly 111 and a second surface 121b (opposite to the first surface 121a) may contact the first long side surface 112f of the second electrode assembly 112.

The side surface part 122 may be bent from an end of the main body 121 and may surround short side surfaces, e.g., both short side surfaces, of the plurality of electrode assemblies 110. The side surface part 122 may have the same shape with, e.g., may be complementary to or conformal to, that of the short side surface of each of the plurality of electrode assemblies 110.

The side surface part 122 may include a first side surface part set 122a (surrounding short side surfaces, e.g., both short side surfaces, of the first electrode assembly 111) and a second side surface part set 122b (surrounding short side surfaces, e.g., both short side surfaces, of the second electrode assembly 112). For example, the first side surface part set 122a may be curved so as to correspond to, e.g., be complementary or conformal to, the shape of each of the short side surfaces 111g of the first electrode assembly 111 and may surround the short side surfaces 111g of the first electrode assembly 111. In an implementation, the second side surface part set 122b may be curved so as to correspond to, e.g., be complementary or conformal to, the shape of each of the short side surfaces of the second electrode assembly 112 and may surround the short side surfaces of the second electrode assembly 112.

A first coupling part 123 (to be coupled to the second support body 130) may be provided at a lower portion of an outer surface of the side surface part 122. For example, the outer surface may be a surface facing the case 160. The first coupling part 123 may be, e.g., a protrusion that protrudes outwardly.

The first support body 120 may not protrude beyond upper and/or lower portions of the first electrode assembly 111 and the second electrode assembly 112. For example, the first support body 120 may have a height that is smaller than or equal to heights of the long side surface and the short side surface of the first electrode assembly 111. In an implementation, a bottom end of the first support body 120 may be coplanar with or aligned with a bottom surface of the first electrode assembly 111 and a bottom surface of the second electrode assembly 112, and portions of top ends of the first electrode assembly 111 and the second electrode assembly 112 may be exposed at the outside of the first support body 120, e.g., may extend higher than a height of the first support body 120.

As noted above, the curved side surface part 122 may have elasticity. In a state in which the side surface part 122 is enlarged toward the outside of the case 160 by elastic deformation, after the first support body 120 is coupled with the first and second electrode assemblies 111 and 112, it may be restored to be closely adhered to both side short surfaces of the first and second electrode assemblies 111 and 112 to then be fastened thereto.

The first support body 120 may be sequentially coupled to the first electrode assembly 111 and the second electrode assembly 112 after the first electrode assembly 111 and the second electrode assembly 112 are welded to the first terminal 140 and the second terminal 150.

The first support body 120 may be formed of, e.g., polypropylene or polyethylene. In an implementation, the first support body 120 may be made of an insulating material.

The first support body 120 may be housed in the case 160 with the electrode assemblies 111 and 112.

The second support body 130 may have a plate shape and may be interposed between each of the bottom surfaces of the electrode assemblies 111 and 112 and the case 160. The second support body 130 may cover bottom surfaces of the plurality of electrode assemblies 111 and 112. The second support body 130 may be shaped to correspond to or complement the bottom surfaces of the plurality of electrode assemblies 111 and 112. The second support body 130 may include a second coupling part 131 protruding from or near opposite corners or edges thereof toward the cap assembly 170 to then be coupled with the first coupling part 123 of the first support body 120.

The second coupling part 131 may cover a lower portion of an outer surface of the side surface part 122 of the first support body 120, and may contact the side surface part 122. The second coupling part 131 may have a hole 131a aligned with and/or coupled to the first coupling part 123 of the first support body 120, and the hole 131a may be shaped to correspond to, e.g., to complement or to be interengaged with, the first coupling part 123.

The second support body 130 may be formed of, e.g., polypropylene or polyethylene. In an implementation, the second support body 130 may be made of an insulating material.

The first terminal 140 may be made of a metal or the like, and may be electrically connected to the first electrode tabs 111*d* and 112*d* of the first electrode assembly 111 and the second electrode assembly 112. The first terminal 140 may include a first fastening terminal 141 (connected to the first electrode tabs 111*d* and 112*d*) and a first electrode terminal 142 (coupled to the first fastening terminal 141).

The first fastening terminal 141 may penetrate through the cap plate 171 to upwardly extend and protrude by a predetermined length, and may be electrically connected to the first electrode tabs 111*d* and 112*d* from a lower portion of the cap plate 171. The first fastening terminal 141 may upwardly extend and may protrude from the cap plate 171 by a predetermined length, and a laterally extending flange 141*a* may be formed at the lower portion of the cap plate 171 to help prevent the first fastening terminal 141 from being dislodged from the cap plate 171. The first electrode tabs 111*d* and 112*d* may be welded to a bottom surface of the flange 141*a* of the first fastening terminal 141. In an implementation, a region formed on the flange 141*a* of the first fastening terminal 141 may penetrate through the cap plate 171 to upwardly extend and protrude by a predetermined length, and may be coupled to the first electrode terminal 142 to then be fixed.

The first electrode terminal 142 may be plate shaped and may have a first terminal hole 142*a* penetrating top and bottom surfaces of the first electrode terminal 142. The first terminal hole 142*a* of the first electrode terminal 142 may be sized and shaped to horizontally correspond to the first fastening terminal 141 to accommodate the first fastening terminal 141. The first electrode terminal 142 may be riveted or welded such that the first fastening terminal 141 protruding to or at an upper portion of the cap plate 171 is inserted into the first terminal hole 142*a*.

The first terminal 140 may be made of, e.g., copper, a copper alloy, or the like.

The second terminal 150 may be generally made of a metal or the like and may be electrically connected to the second electrode tabs 111*e* of the first electrode assembly 111 and the second electrode assembly 112. In an implementation, the second terminal 150 may be electrically connected to the cap plate 171. The second terminal 150 may include a second fastening terminal 151 (connected to the second electrode tabs 111*e* of the first electrode assembly 111 and the second electrode assembly 112) and a second electrode terminal 152 (coupled to the second fastening terminal 151).

The second fastening terminal 151 may penetrate through the cap plate 171 to upwardly extend and protrude by a predetermined length, and may be electrically connected to the second electrode tab 111*e* from or at a lower portion of the cap plate 171. The second fastening terminal 151 may upwardly extend and may protrude from the cap plate 171 by a predetermined length, and a laterally extending flange 151*a* may be formed at the lower portion of the cap plate 171 to help prevent the second fastening terminal 151 from being dislodged from the cap plate 171. The second electrode tab 111*e* may be welded to a bottom surface of the flange 151*a* of the second fastening terminal 151. In an implementation, a region formed on the flange 151*a* of the second fastening terminal 151 may penetrate through the cap plate 171 to upwardly extend and protrude by a predetermined length, and may be coupled to the second electrode terminal 152 to then be fixed.

The second electrode terminal 152 may have a plate shape and may include a second terminal hole 152*a* penetrating top and bottom surfaces of the second electrode terminal 152. The second terminal hole 152*a* of the second electrode terminal 152 may be sized and shaped to horizontally correspond to the second fastening terminal 151 to accommodate the second fastening terminal 151. The second electrode terminal 152 may be riveted or welded such that the second fastening terminal 151 protruding to an upper portion of the cap plate 171 may be inserted into the second terminal hole 152*a*.

The second terminal 150 may be made of, e.g., aluminum, an aluminum alloy, or the like.

The case 160 may be made of a conductive metal, e.g., aluminum, aluminum alloy, or nickel plated steel, and may take an approximately hexagonal shape that defines an inner space for receiving the electrode assemblies 110, the first support body 120, and the second support body 130. Referring to FIG. 1 illustrating a state in which the case 160 and the cap assembly 170 are assembled, although an opening is not shown, the opening corresponds to a circumference of the cap assembly 170.

The cap assembly 170 may be coupled to the case 160. For example, the cap assembly 170 may include the cap plate 171, a seal gasket 172, a plug 173, a safety vent 174, and an insulation member 175. The seal gasket 172 and the insulation member 175 may also be regarded as components of the first terminal 140 and the second terminal 150.

The cap plate 171 may seal the opening of the case 160 and may be made of the same material as the case 160. For example, the cap plate 171 may be coupled to the case 160 by laser welding. In an implementation, if the cap plate 171 is electrically connected to the second terminal 150, the cap plate 171 and the second terminal 150 may have the same polarity. Accordingly, the cap plate 171 and the case 160 may also have the same polarity.

The seal gasket 172, made of an insulating material, may be located between each of the first fastening terminal 141 and the second fastening terminal 151 and the cap plate 171, and may seal each of the first fastening terminal 141 and the second fastening terminal 151 and the cap plate 171. The seal gasket 172 may help prevent external moisture from penetrating into the rechargeable battery 100 and/or may help prevent an electrolytic solution contained in the rechargeable battery 100 from flowing out.

The plug 173 may seal the electrolyte injection hole 171*a* of the cap plate 171. The safety vent 174 may be installed in a vent hole 171*b* of the cap plate 171 and may have a notch 174*a* to be opened at a preset pressure.

The insulation member 175 may be located between each of the first electrode terminal 151 and the second electrode terminal 152 and the cap plate 171. In an implementation, the insulation member 175 may be closely adhered to the cap plate 171. In an implementation, the insulation member 175 may also be closely adhered to the seal gasket 172. The insulation member 175 may insulate each of the first electrode terminal 151 and the second electrode terminal 152 from the cap plate 171. In an implementation, the insulation member 175 may help prevent unnecessary and undesirable short circuits between each of the first electrode terminal 151 and the second electrode terminal 152 and the cap plate 171.

In the rechargeable battery 100 according to an embodiment, the plurality of electrode assemblies 110 having flexible electrode tabs may be fixed to the interior side of the case 160 by the first support body 120 and the second support body 130 to then be insulated. In addition, the rechargeable battery 100 may help prevent the plurality of electrode assemblies 110 from being deformed due to external shocks by shock-absorbing functions using the first support body 120 and the second support body 130 having elasticity.

Figure 7:
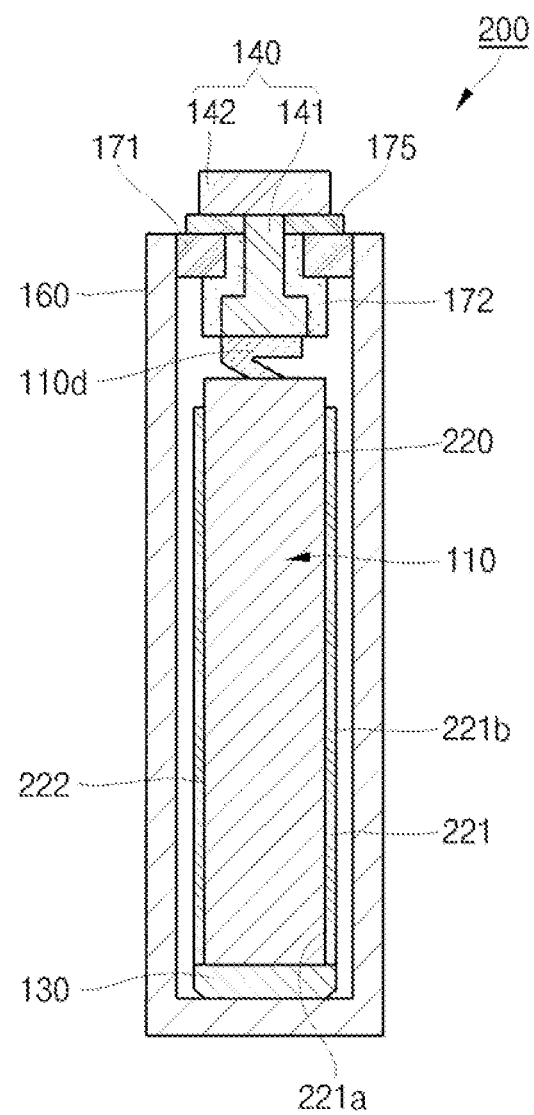
FIG. 7 illustrates a cross-sectional view of a rechargeable battery according to another embodiment.

FIG. 7 illustrates a cross-sectional view of a rechargeable battery according to another embodiment. As shown in FIG. 7, the rechargeable battery 200 may include an electrode assembly 110, a first support body 220, a second support body 130, a first terminal 140, a second terminal 150, a case 160, and a cap assembly 170. The rechargeable battery 200 shown in FIG. 7 may include only one electrode assembly 110, and may be different from the rechargeable battery 100 shown in FIGS. 1 to 4 in view of a configuration of the first support body 220 for supporting the electrode assembly 110. Thus, the following description will focus on the configuration of the first support body 220, which is a different feature from the rechargeable battery 100 shown in FIGS. 1 to 4. The rechargeable battery 200 shown in FIG. 7 may have the same perspective view with the rechargeable battery 100 shown in FIG. 1.

Figure 8:
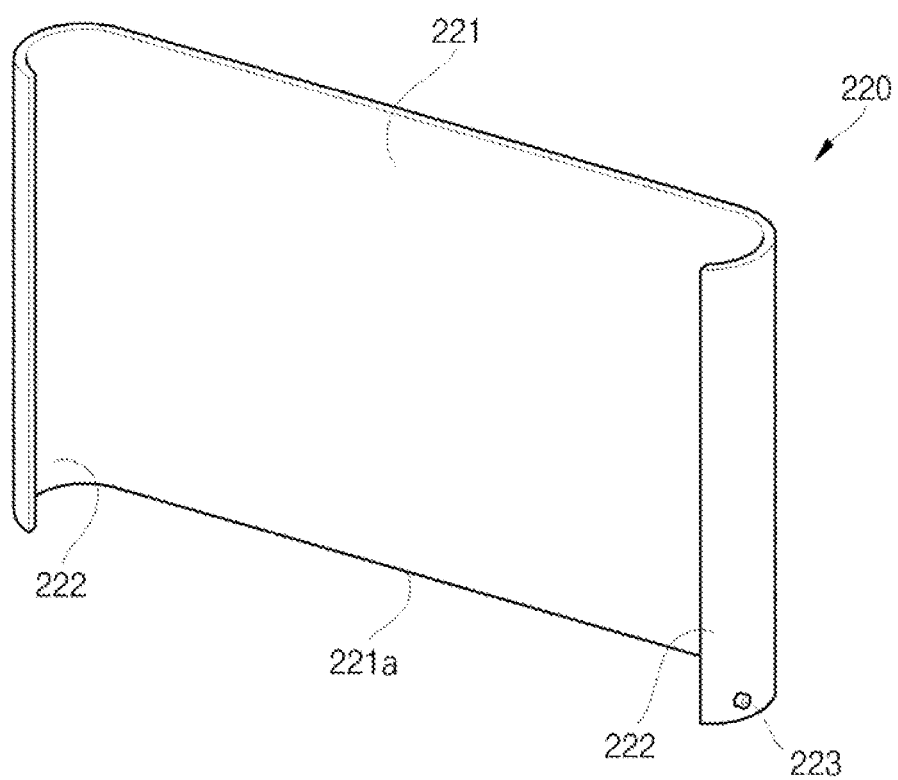
FIG. 8 illustrates a perspective view of a first support body in the rechargeable battery shown in FIG. 7.

The first support body 220 may fix the electrode assembly 110 to the interior side of a case 160 while surrounding a side portion of the electrode assembly 110. The first support body 220 is illustrated in FIG. 8, and the first support body 220 will now be described with reference to FIGS. 5, 7, and 8.

The first support body 220 may include a plate-shaped main body 221 and a side surface part 222 that is bent from the main body 221 and having elasticity. The main body 221 of the first support body 220 and the side surface part 222 may be integrally formed.

The main body 221 may be plate-shaped and may be interposed between a first long side surface of the electrode assembly 110 and the case 160. In the main body 221, a first surface 221a may contact the first long side surface of the electrode assembly 110, and a second surface 221b (opposite to the first surface 221a) may face the inner surface of the case 160.

The side surface part 222 may be bent from opposite ends of the main body 221, and may surround opposite short side surfaces of the electrode assembly 110. The side surface part 222 may have the same shape with, e.g., a complementary or conformal shape to, that of each of the short side surfaces of the electrode assembly 110. The side surface part 222 (curved to correspond to, conform to, or complement the shape of each of the short side surfaces of the electrode assembly 110) may extend from the main body 221 and may include a pair of side surface parts to surround the opposite short side surfaces of the electrode assembly 110.

A first coupling part 223 (to be coupled to the second support body 130) may be provided at a lower portion of an outer surface of the side surface part 222. For example, the outer surface may be a surface facing the case 160. The first coupling part 223 may be, e.g., a protrusion.

The first support body 220 may not protrude to or beyond upper or lower portions of the electrode assembly 110. The first support body 220 may have a height that is smaller than or equal to a height of the long side surface of the electrode assembly 110. In an implementation, a bottom end of the first support body 220 may be coplanar or aligned with a bottom surface of the electrode assembly 110, and a portion of a top end of the electrode assembly 110 may be exposed to the outside through the first support body 220, e.g., may extend above or beyond an upper end of the first support body 220.

In an implementation, the curved side surface part 222 may have elasticity. In a state in which the side surface part 222 is enlarged toward the outside of the case 160 by elastic deformation, after the first support body 120 is coupled to the electrode assembly 110, it may be restored to be closely adhered to both side short surfaces of the electrode assembly 110 to then be fastened thereto.

The first support body 220 may be sequentially coupled to the electrode assembly 110 after the first electrode tab and the second electrode tab of the electrode assembly 110 are welded to the first terminal 140 and the second terminal 150.

The first support body 220 may be formed of, e.g., polypropylene or polyethylene. In an implementation, the first support body 220 may be made of an insulating material.

The first support body 220 may be housed in an inner space of the case 160 with the electrode assembly 110.

The embodiments may provide a rechargeable battery, in which an electrode assembly (including a flexible electrode tab) is fixed to an interior side of a case by a first support body and a second support body to then be insulated.

The embodiments may provide a rechargeable battery, which may help prevent an electrode assembly from being deformed due to an external shock by a shock-absorbing function using a first support body and a second support body.

In the rechargeable battery according to an embodiment, the electrode assembly including a flexible electrode tab may be fixed to the exterior side of the case by the first support body and the second support body to then be insulated.

In addition, in the rechargeable battery according to an embodiment, an electrode assembly may be prevented from being deformed due to an external shock by a shock-absorbing function using a first support body and a second support body.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:
1. A rechargeable battery, comprising:
an electrode assembly having a first electrode tab upwardly protruding from the electrode assembly and a second electrode tab upwardly protruding from the electrode assembly, the electrode assembly including a first electrode assembly and a second electrode assembly;
a first support body surrounding a side portion of the electrode assembly;
a case accommodating the electrode assembly and the first support body, the case having a top opening; and
a cap assembly sealing the top opening of the case,
wherein the first support body includes:
 a plate-shaped main body contacting one long side surface of the electrode assembly, and
 a side surface part bent from the main body, the side surface part having elasticity and surrounding short side surfaces of the electrode assembly,
wherein the main body of the first support body is interposed between the long side surface of the first electrode assembly and the facing long side surface of the second electrode assembly, wherein the side surface part of the first support body includes a first side surface part set surrounding both short side surfaces of the first electrode assembly and a second side surface part set surrounding both short side surfaces of the second electrode assembly, and wherein the side surface part of the first support body is elastically outwardly deformable for coupling of the first support body to the electrode assembly and elastically inwardly restorable such that an outer end of the side surface part is elastically biased toward the electrode assembly such that the side surface part is adhered to the short side surfaces of the electrode assembly due to the elastic bias and surrounds the short side surfaces of the electrode assembly.

2. The rechargeable battery as claimed in claim 1, wherein:
the electrode assembly includes a first electrode plate, a second electrode plate, and a separator between the first electrode plate and the second electrode plate,
the first electrode tab is a non-coated portion of the first electrode plate of the electrode assembly, and
the second electrode tab is a non-coated portion of the second electrode plate of the electrode assembly.

3. The rechargeable battery as claimed in claim 1, wherein:
the long side surface of the first electrode assembly faces the long side surface of the second electrode assembly.

4. The rechargeable battery as claimed in claim 3, wherein the first electrode assembly and the second electrode assembly are wound to be formed in a jelly-roll shape.

5. The rechargeable battery as claimed in claim 1, wherein:
the first side surface part set has a complementary shape with respect to the short side surface of the jelly-roll shaped first electrode assembly, and
the second side surface part set has a complementary shape with respect to the short side surface of the jelly-roll shaped second electrode assembly.

6. The rechargeable battery as claimed in claim 1, wherein the cap assembly includes:
a cap plate sealing the top opening of the case;
a first terminal electrically connected to the first electrode tab, the first terminal upwardly protruding while passing through the cap plate; and
a second terminal electrically connected to the second electrode tab, the second terminal upwardly protruding while passing through the cap plate.

7. The rechargeable battery as claimed in claim 6, wherein:
the first electrode tab of the electrode assembly is welded to the first terminal, and
the second electrode tab of the electrode assembly is welded to the second terminal.

8. The rechargeable battery as claimed in claim 1, wherein the first support body has a height that is smaller than or equal to a height of the long side surface of the electrode assembly.

9. The rechargeable battery as claimed in claim 1, further comprising a second support body interposed between a bottom surface of the electrode assembly and the case.

10. The rechargeable battery as claimed in claim 9, wherein the first support body and the second support body are insulators.

11. The rechargeable battery as claimed in claim 9, wherein the second support body:
has a plate shape, and
includes a second coupling part, the second coupling part protruding at opposite edges of the second coupling part toward the cap assembly and being coupled with the first support body.

12. The rechargeable battery as claimed in claim 11, wherein the first support body further includes a first coupling part at a bottom end of the side surface part, the first coupling part being coupled with the second coupling part of the second support body.

13. The rechargeable battery as claimed in claim 12, wherein:
the first coupling part is a protrusion that protrudes outwardly, and
the second coupling part includes a hole aligned with the first coupling part such that the first coupling part is inserted and fixed to the second coupling part.

* * * * *